E. BUSWELL & T. CASCADEN, Jr.
CONVEYER APRON FOR FERTILIZER DISTRIBUTERS.
APPLICATION FILED OCT. 13, 1909.
971,662.
Patented Oct. 4, 1910.
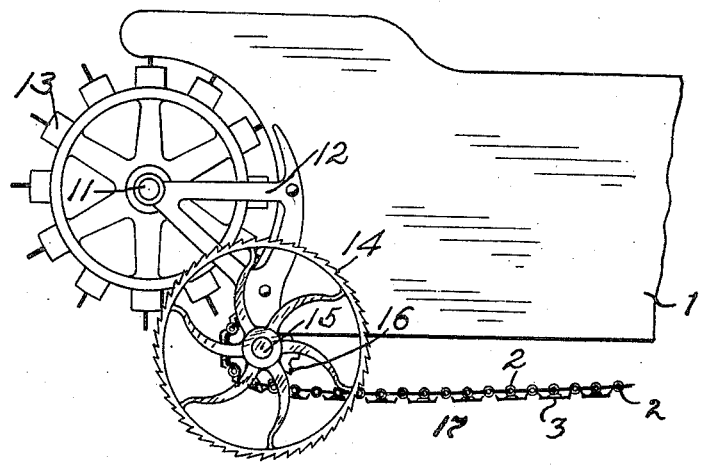
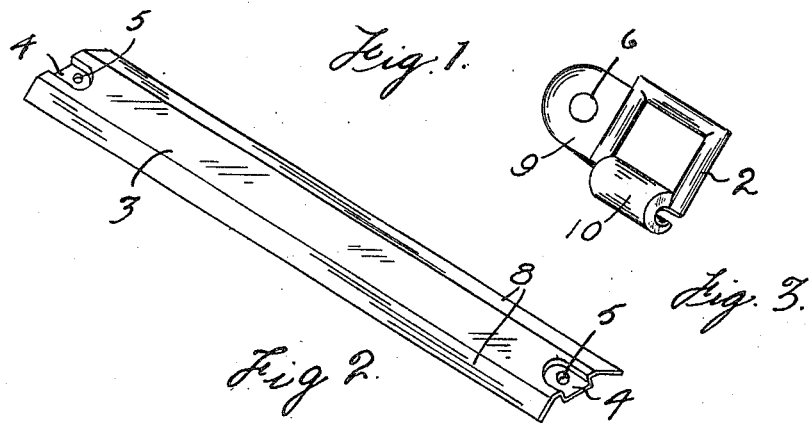
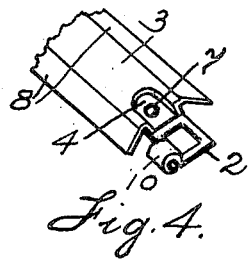
WITNESSES:
H. B. Burr.
Hazle Fredin
INVENTORS
Eugene Buswell
and
Thomas Cascaden, Jr.
BY G. C. Kennedy.
ATTORNEY.

UNITED STATES PATENT OFFICE.

EUGENE BUSWELL AND THOMAS CASCADEN, JR., OF WATERLOO, IOWA; SAID BUSWELL ASSIGNOR TO SAID CASCADEN.

CONVEYER-APRON FOR FERTILIZER-DISTRIBUTERS.

971,662. Specification of Letters Patent. Patented Oct. 4, 1910.

Application filed October 13, 1909. Serial No. 522,418.

*To all whom it may concern:*

Be it known that we, EUGENE BUSWELL and THOMAS CASCADEN, Jr., citizens of the United States of America, and residents of Waterloo, Blackhawk county, Iowa, have invented certain new and useful Improvements in Conveyer-Aprons for Fertilizer-Distributers, of which the following is a specification.

Our invention relates to improvements in conveyer-aprons for fertilizer distributers, and the object of our improvement is to provide pressed metal transverse apron slats for such conveyers, which are structurally light and strong, and otherwise efficient to fulfil their function in the machine. This object we have accomplished by the means which are hereinafter fully described and claimed, and which are illustrated in the accompanying drawings, in which:

Figure 1 is a right-hand side elevation of the rear half of a fertilizer distributer box and of its endless conveyer-apron, whose transverse slats are formed according to the principles embodied in our invention. Fig. 2 is an enlarged perspective view of one of our pressed metal apron-slats. Fig. 3 is an enlarged perspective view of one of the apron-chain links. Fig. 4 is a perspective view of a portion of one of our pressed metal slats with one of the apron-links seated thereon and secured thereto.

Similar numerals refer to similar parts throughout the several views.

The numeral 1 designates the rear portion of the wagon-box of a fertilizer distributer, the carrying-wheels and various other portions of the mechanism not being shown. A radially-toothed distributing-drum 13 is mounted at the rear open end of said box on a rotary shaft 11 set in brackets 12 in the usual manner. Extending throughout the said box and also passing underneath it is the endless conveyer-apron 17, which is constructed of closely abutting transverse slats 3 secured at either end to endless sprocket-chains formed of connected open links 2. These sprocket-chains are driven by intermeshing sprocket-wheels 16 secured to a rotary shaft 15, the latter having on one end a ratchet-wheel 14, which may be rotated by any convenient driving-pawl mechanism.

The slats 3 are each pressed from a single piece of steel, iron or other suitable metal, and may be galvanized or otherwise coated with any desired anti-corrosive substance. The slat 3 is flat with its edges along the long sides bent down at less than a right angle, divergent. These downwardly directed portions 8, by arching the structure of the slot, strengthen it. At each end of the slat a small area 4 is pressed down so as to provide a raised seat on the under surface for an inwardly-projected lug 9 of a sprocket-chain link 2, the lug being secured to the seat 4 by means of a rivet or bolt 7 passed through the registering orifices 5 and 6 of said seat and lug respectively. The open links 2 have on one end each a hook 10 to engage the adjacent link, to thereby form, when all assembled together, a united endless chain 17. The raised seat 4 on the slat-end raises the body of the slat from the sprocket-chains, and thus prevents interference in passing the latter about the sprocket-wheels intermeshed therewith. The directing of the slat flanges 8 downward, prevents interference with the superincumbent load, as well as strengthening the apron. By reason of the seating of each chain-link removably on the adjacent end of the abutting slat on a raised portion of the latter, the parts may be readily disassembled or disconnected for repairs, as well as reconnected.

Having described our invention, what we claim as new, and desire to secure by Letters Patent, is:

1. In combination, a conveyer-apron composed of a plurality of transverse slats, and means for linking said slats together consisting of connected sprocket-chain links having inwardly projecting lugs, each slat having a depressed area at each end, both said depressed areas and said link-lugs being perforated, and means inserted in the registering perforations of each contacting lug and depressed area suitable for securing them detachably together.

2. In combination, a conveyer-apron composed of a plurality of transverse slats, and means for linking said slats together consisting of connected sprocket-chain links having inwardly projecting lugs, each slat having a depressed area at each end, both said depressed areas and said link-lugs being perforated, means inserted in the registering perforations of each contacting lug and depressed area suitable for securing them detachably together, both longitudinal edges of said slats having longitudinal strengthening ribs.

3. In a conveyer apron for a fertilizer distributer, transverse carrying members, each having flanges at its longitudinal edges, and recessed seats at each end, and means for linking the recessed seats on the adjacent ends of such members together detachably.

4. In combination, a conveyer-apron composed of a plurality of transverse slats, and means for linking said slats together, each slat being formed of a single metal strip having both longitudinal edges bent divergently to one side away from the carrying surface of the slat, each of said slats having a recessed seat at each end, and means for linking the recessed seats on the adjacent ends of such members together detachably.

Signed at Waterloo, Iowa, this 25th day of Sept., 1909.

EUGENE BUSWELL.
THOMAS CASCADEN, Jr.

Witnesses:
G. C. KENNEDY,
O. D. YOUNG.